(12) United States Patent
Hollands et al.

(10) Patent No.: US 11,269,457 B1
(45) Date of Patent: Mar. 8, 2022

(54) SYSTEMS AND METHODS FOR IMPROVED TOUCH SCREEN SELECTIVITY AND SENSITIVITY

(71) Applicant: Apple Inc., Cupertino, CA (US)

(72) Inventors: Matthew Dominic Hollands, San Francisco, CA (US); Andreas Johannes Koeberl, San Francisco, CA (US); Emmanuell Jose Merced-Grafals, San Jose, CA (US); Sai Zhang, Sunnyvale, CA (US); Eric S. Winokur, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/166,738

(22) Filed: Feb. 3, 2021

(51) Int. Cl.
*G06F 3/041* (2006.01)
*G06F 3/01* (2006.01)
*G06F 3/044* (2006.01)

(52) U.S. Cl.
CPC .......... *G06F 3/04186* (2019.05); *G06F 3/011* (2013.01); *G06F 3/0445* (2019.05); *G06F 3/04166* (2019.05); *G06F 3/0446* (2019.05)

(58) Field of Classification Search
CPC ............. G06F 3/04186; G06F 3/04166; G06F 3/0445; G06F 3/011; G06F 3/0446
See application file for complete search history.

(56) References Cited

U.S. PATENT DOCUMENTS

| | | | |
|---|---|---|---|
| 3,552,667 A | 1/1971 | Smith | |
| 3,552,687 A | 1/1971 | Howard et al. | |
| 4,825,374 A | 4/1989 | King et al. | |
| 5,335,230 A | 8/1994 | Crooks et al. | |
| 5,463,379 A | 10/1995 | Campbell et al. | |
| 5,483,261 A | 1/1996 | Yasutake | |

(Continued)

FOREIGN PATENT DOCUMENTS

| | | |
|---|---|---|
| CN | 101471983 A | 7/2009 |
| EP | 1355223 A2 | 10/2003 |

(Continued)

OTHER PUBLICATIONS

Advisory Action received for U.S. Appl. No. 12/504,639, dated Dec. 13, 2013, 3 pages.

(Continued)

*Primary Examiner* — Michael Pervan
(74) *Attorney, Agent, or Firm* — Kubota & Basol LLP

(57) ABSTRACT

In some examples, an electronic device can classify patches of touch data obtained by a touch screen as corresponding to intentional user inputs or not corresponding to intentional user inputs. The device can include a touch screen on a first side of housing of the device and a drive electrode on a second side of the housing of the device in some examples. In some examples, the drive electrode on the second side of the housing of the device can apply a signal to the body of the user and the device can classify patches of touch data including characteristics of this signal as corresponding to intentional touches provided by the user. The device can perform subsequent operations in response to intentional touches provided by the user and forgo performing operations in response to patches of touch data that do not correspond to intentional touches provided by the user.

20 Claims, 8 Drawing Sheets

(56) References Cited

U.S. PATENT DOCUMENTS

| | | | |
|---|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,066,954 A | 5/2000 | Gershenfeld et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,466,036 B1 | 10/2002 | Philipp |
| 6,469,524 B1 | 10/2002 | Oberdier |
| 6,479,122 B2 | 11/2002 | Sakamoto et al. |
| 6,504,269 B1 | 1/2003 | Miyajima et al. |
| 6,531,865 B1 | 3/2003 | Mai et al. |
| 6,531,885 B1 | 3/2003 | Manhaeve et al. |
| 6,690,367 B2 | 2/2004 | Akimoto |
| 6,690,387 B2 | 2/2004 | Zimmerman et al. |
| 7,015,694 B2 | 3/2006 | Bluemich |
| 7,015,894 B2 | 3/2006 | Morohoshi |
| 7,069,357 B2 | 6/2006 | Marx et al. |
| 7,180,508 B2 | 2/2007 | Kent et al. |
| 7,184,064 B2 | 2/2007 | Zimmerman et al. |
| 7,254,775 B2 | 8/2007 | Geaghan |
| 7,663,607 B2 | 2/2010 | Hotelling et al. |
| 7,714,880 B2 | 5/2010 | Johnson |
| 8,482,544 B2 | 7/2013 | Land et al. |
| 8,502,800 B1 | 8/2013 | Vier |
| 8,717,331 B2 | 5/2014 | Kremin et al. |
| 9,632,622 B2 | 4/2017 | Hotelling et al. |
| 9,939,966 B2 | 4/2018 | Bulea |
| 10,095,361 B2 | 10/2018 | Mishalov |
| 10,126,854 B2 | 11/2018 | Johansson et al. |
| 10,254,879 B1 | 4/2019 | Oral et al. |
| 10,754,438 B2 | 8/2020 | Tucker et al. |
| 2005/0179671 A1 | 8/2005 | Degroot et al. |
| 2005/0212753 A1 | 9/2005 | Marvit et al. |
| 2005/0219228 A1 | 10/2005 | Alameh et al. |
| 2006/0022959 A1 | 2/2006 | Geaghan |
| 2006/0026521 A1 | 2/2006 | Hotelling et al. |
| 2006/0097991 A1 | 5/2006 | Hotelling et al. |
| 2006/0166702 A1 | 7/2006 | Dietz et al. |
| 2006/0197753 A1 | 9/2006 | Hotelling |
| 2006/0236522 A1 | 10/2006 | Lin |
| 2006/0238522 A1 | 10/2006 | Westerman et al. |
| 2007/0050646 A1 | 3/2007 | Conroy et al. |
| 2007/0074913 A1 | 4/2007 | Geaghan et al. |
| 2007/0200831 A1 | 8/2007 | Wang |
| 2008/0165115 A1 | 7/2008 | Herz et al. |
| 2008/0165116 A1 | 7/2008 | Herz et al. |
| 2008/0216001 A1 | 9/2008 | Ording et al. |
| 2008/0267462 A1 | 10/2008 | Nelson et al. |
| 2009/0002343 A1 | 1/2009 | Land et al. |
| 2009/0012657 A1 | 1/2009 | Knotts et al. |
| 2009/0032312 A1 | 2/2009 | Huang et al. |
| 2009/0160767 A1 | 6/2009 | Sugaya et al. |
| 2009/0160787 A1 | 6/2009 | Westerman et al. |
| 2009/0174676 A1 | 7/2009 | Westerman |
| 2009/0174686 A1 | 7/2009 | Jeon et al. |
| 2009/0174688 A1 | 7/2009 | Westerman |
| 2009/0181719 A1 | 7/2009 | Cho |
| 2009/0194341 A1 | 8/2009 | Nousiainen |
| 2009/0250268 A1 | 10/2009 | Staton et al. |
| 2009/0251423 A1 | 10/2009 | Jung |
| 2009/0284495 A1 | 11/2009 | Geaghan et al. |
| 2010/0013775 A1 | 1/2010 | Son |
| 2010/0060608 A1 | 3/2010 | Yousefpor |
| 2010/0073301 A1 | 3/2010 | Yousefpor et al. |
| 2011/0006832 A1 | 1/2011 | Land et al. |
| 2011/0012840 A1 | 1/2011 | Hotelling et al. |
| 2011/0310064 A1 | 12/2011 | Keski-Jaskar et al. |
| 2015/0018660 A1* | 1/2015 | Thomson ............... A61B 5/332 600/393 |
| 2017/0199625 A1 | 7/2017 | Hotelling et al. |
| 2021/0169392 A1* | 6/2021 | Albert .................... G16H 10/60 |

FOREIGN PATENT DOCUMENTS

| | | | |
|---|---|---|---|
| JP | 2000-163031 A | | 6/2000 |
| JP | 2002-342033 A | | 11/2002 |
| JP | 2006-106853 A | | 4/2006 |
| JP | 2014229223 A | * | 12/2014 |
| KR | 10-2005-0039787 A | | 4/2005 |
| WO | 2006/101316 A1 | | 9/2006 |
| WO | 2008/035235 A1 | | 3/2008 |
| WO | 2010/030710 A1 | | 3/2010 |
| WO | 2011/008610 A1 | | 1/2011 |

OTHER PUBLICATIONS

Examiner's Answer to Appeal Brief received for U.S. Appl. No. 12/504,639, dated Feb. 27, 2014, 3 pages.
Final Office Action received for U.S. Appl. No. 12/504,639, dated Aug. 1, 2013, 17 pages.
Final Office Action received for U.S. Appl. No. 15/470,690, dated May 18, 2018, 20 pages.
First Action Interview Office Action received for U.S. Appl. No. 15/470,690, dated Nov. 8, 2017, 6 pages.
International Search Report received for PCT Patent Application No. PCT/US2010/041248, dated Sep. 7, 2010, 2 pages.
Non-Final Office Action received for U.S. Appl. No. 12/504,639, dated Feb. 1, 2013, 16 pages.
Non-Final Office Action received for U.S. Appl. No. 12/504,639, dated Jun. 20, 2016, 18 pages.
Non-Final Office Action received for U.S. Appl. No. 12/504,639, dated May 24, 2012, 15 pages.
Non-Final Office Action received for U.S. Appl. No. 15/470,690, dated Nov. 2, 2018, 14 pages.
Notice of Allowance received for U.S. Appl. No. 12/504,639, dated Dec. 15, 2016, 11 pages.
Notice of Allowance received for U.S. Appl. No. 15/470,690, dated Mar. 11, 2019, 11 pages.
Patent Board Decision received for U.S. Appl. No. 12/504,639, dated Mar. 14, 2016, 6 pages.
Preinterview First Office Action received for U.S. Appl. No. 15/470,690, dated Jul. 14, 2017, 6 pages.
Search Report received for European Patent Application No. 10169838.9, dated Mar. 4, 2014, 7 pages.
Search Report received for GB Patent Application No. 1112858.4, dated Nov. 2, 2011, 2 pages.
Search Report received for GB Patent Application No. 1112858.4, dated Feb. 11, 2013, 3 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

* cited by examiner

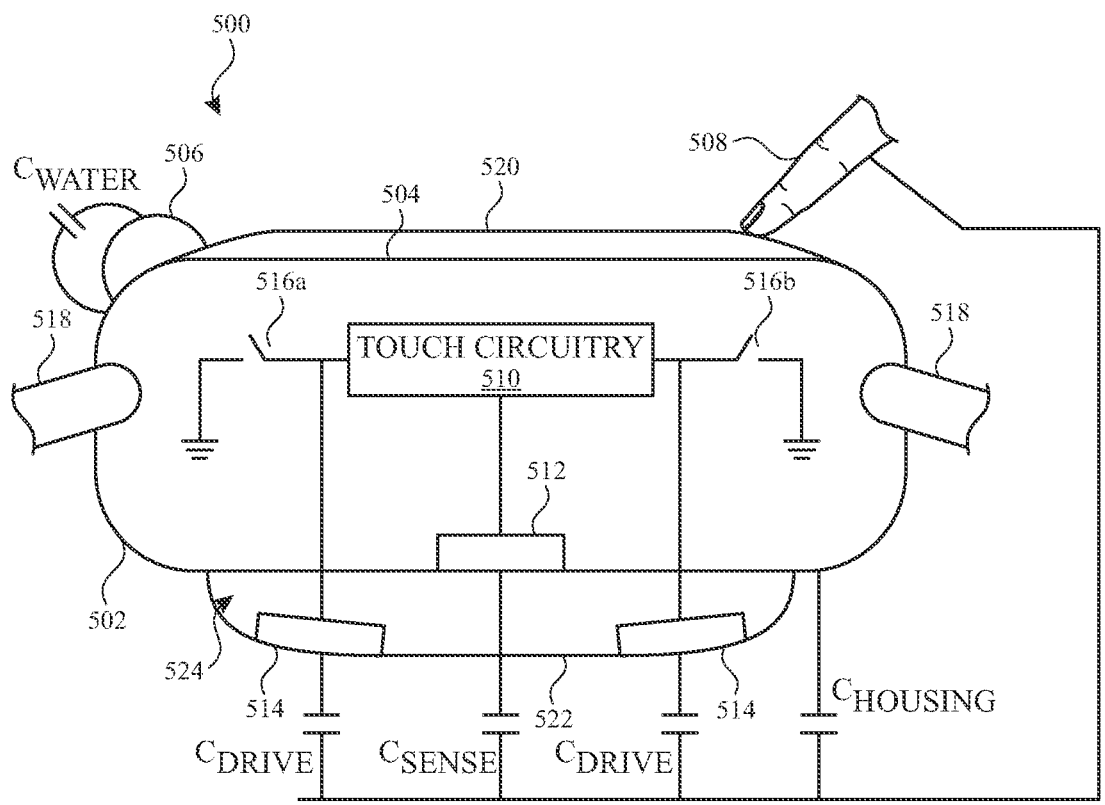
*FIG. 5*
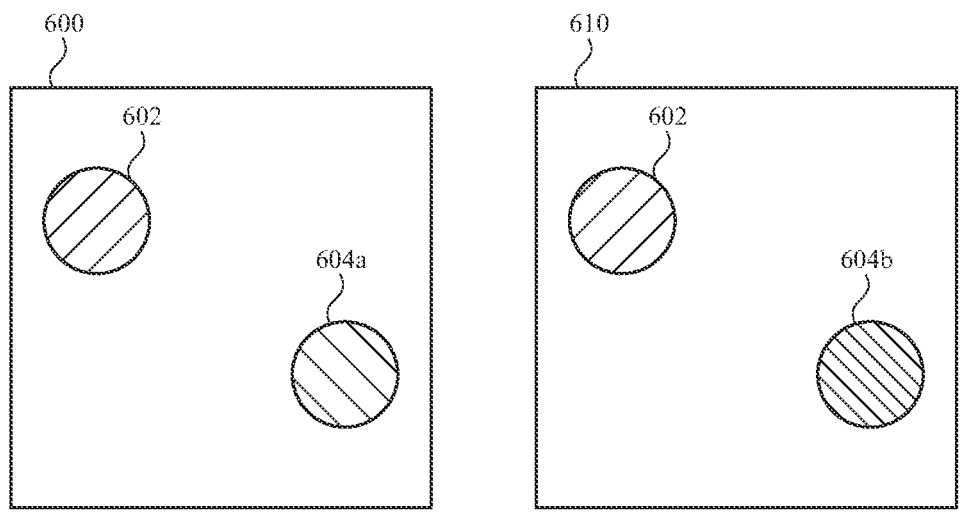
*FIG. 6A*  *FIG. 6B*

SYSTEMS AND METHODS FOR IMPROVED TOUCH SCREEN SELECTIVITY AND SENSITIVITY

FIELD OF THE DISCLOSURE

This relates generally to electronic devices including touch screens and, more specifically, to an electronic device with additional drive electrodes that apply a signal to the user for the purpose of classifying touches as being caused by the user or not being caused by the user.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). In some implementations, due in part to their substantial transparency, some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

BRIEF SUMMARY OF THE DISCLOSURE

Embodiments described herein relate generally to electronic devices including touch screens and, more specifically, to an electronic device with additional drive electrodes that apply a signal to the user for the purpose of classifying touches as being caused by the user or not being caused by the user. In some examples, a touch screen can detect objects proximate to or touching a surface of the touch screen, including the body (e.g., a finger) of the user, input devices, and other objects not intentionally brought into contact with or close proximity to the touchscreen (e.g., drops of water). It can be advantageous in some examples to classify patches of touch data as corresponding to an intentional touch by the user or an unintentional touch (e.g., a drop of water). For example, the electronic device can perform operations in response to patches of touch data that correspond to intentional touches provided by the user and forgo performing operations in response to patches of touch data that do not correspond to intentional touches provided by the user.

In some examples, an electronic device can include a touch screen and additional drive electrodes separate from the touch screen. The additional drive electrodes can apply a signal to the body of the user in some examples and this signal can be detected in the touch data obtained by the touch screen. For example, a wearable device can include a touchscreen that is visible while the device is worn by the user (e.g., coupled to the user via a strap) and an additional drive electrode that can be in contact with or in close proximity to the body of the user while the device is worn by the user. In some examples, the electronic device can classify patches of touch data including characteristics of the signal applied to the additional drive electrode as touches provided by the user to improve classification of touches as intentional or not intentional.

BRIEF DESCRIPTION OF THE DRAWINGS

FIG. 5 illustrates a cross section of an exemplary electronic device according to some examples of the disclosure.

FIGS. 6A-6B illustrate exemplary frames of touch data according to some examples of the disclosure.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Embodiments described herein relate generally to electronic devices including touch screens and, more specifically, to an electronic device with additional drive electrodes that apply a signal to the user for the purpose of classifying touches as being caused by the user or not being caused by the user. In some examples, a touch screen can detect objects proximate to or touching a surface of the touch screen, including the body (e.g., a finger) of the user, input devices, and other objects not intentionally brought into contact with or close proximity to the touchscreen (e.g., drops of water). It can be advantageous in some examples to classify patches of touch data as corresponding to an intentional touch by the user or an unintentional touch (e.g., a drop of water). For example, the electronic device can perform operations in response to patches of touch data that correspond to intentional touches provided by the user and forgo performing operations in response to patches of touch data that do not correspond to intentional touches provided by the user.

In some examples, an electronic device can include a touch screen and additional drive electrodes separate from the touch screen. The additional drive electrodes can apply a signal to the body of the user in some examples and this signal can be detected in the touch data obtained by the touch screen. For example, a wearable device can include a touchscreen that is visible while the device is worn by the user (e.g., coupled to the user via a strap) and an additional drive electrode that can be in contact with or in close proximity to the body of the user while the device is worn by the user. In some examples, the electronic device can classify patches of touch data including characteristics of the signal applied to the additional drive electrode as touches provided by the user to improve classification of touches as intentional or not intentional.

Figure 1A:
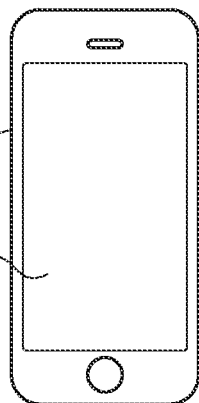
FIGS. 1A-1E illustrate example systems that can use secondary electrode techniques according to examples of the disclosure.
Figure 1B:
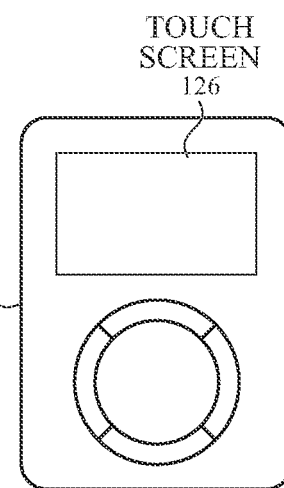
Figure 1C:
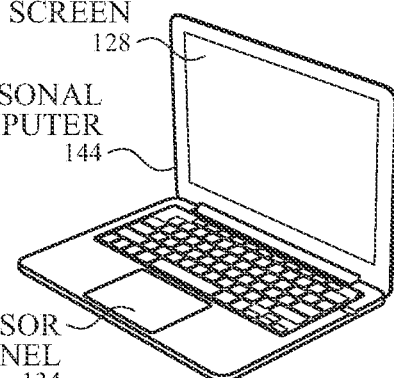
Figure 1D:
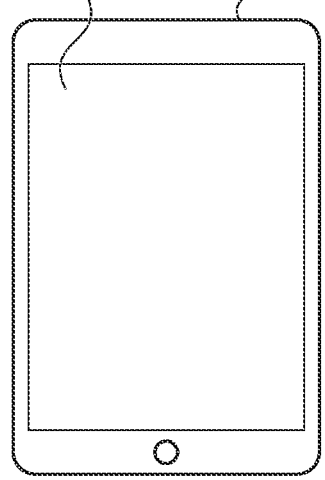
Figure 1E:
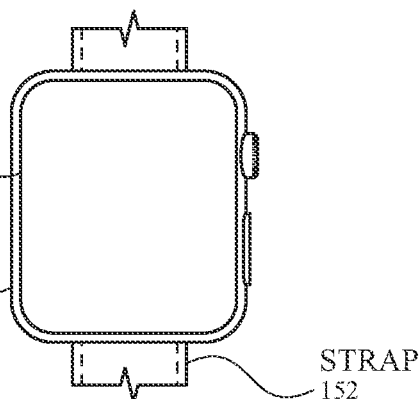

FIGS. 1A-1H illustrate example systems that can use secondary electrode techniques according to examples of the disclosure. FIG. 1A illustrates an example mobile telephone 136 that includes a touch screen 124 that can use secondary electrode techniques according to examples of the disclosure. FIG. 1B illustrates an example digital media player 140 that includes a touch screen 126 that can use secondary electrode techniques according to examples of the disclosure. FIG. 1C illustrates an example personal computer 144 that includes a touch screen 128 and a touch sensor panel 134 (e.g., a trackpad) that can use secondary electrode techniques according to examples of the disclosure. FIG. 1D illustrates an example tablet computing device 148 that includes a touch screen 130 that can use secondary electrode techniques according to examples of the disclosure. FIG. 1E illustrates an example wearable device 150 that includes a touch screen 132 and can be attached to a user using a strap 152 and that can use secondary electrode techniques according to examples of the disclosure.

In some examples, touch screens 124, 126, 128, 130 and 132 and touch sensor panel 134 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can support multi-touch, single touch, projection scan, etc., touch functionality.

In some examples, touch screens 124, 126, 128, 130 and 132, touch sensor panel 134 can be based on mutual capacitance. A mutual capacitance based touch system can include electrodes arranged as drive and sense lines (e.g., as described below with reference to FIG. 4A) that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 and touch sensor panel 134 can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation, electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
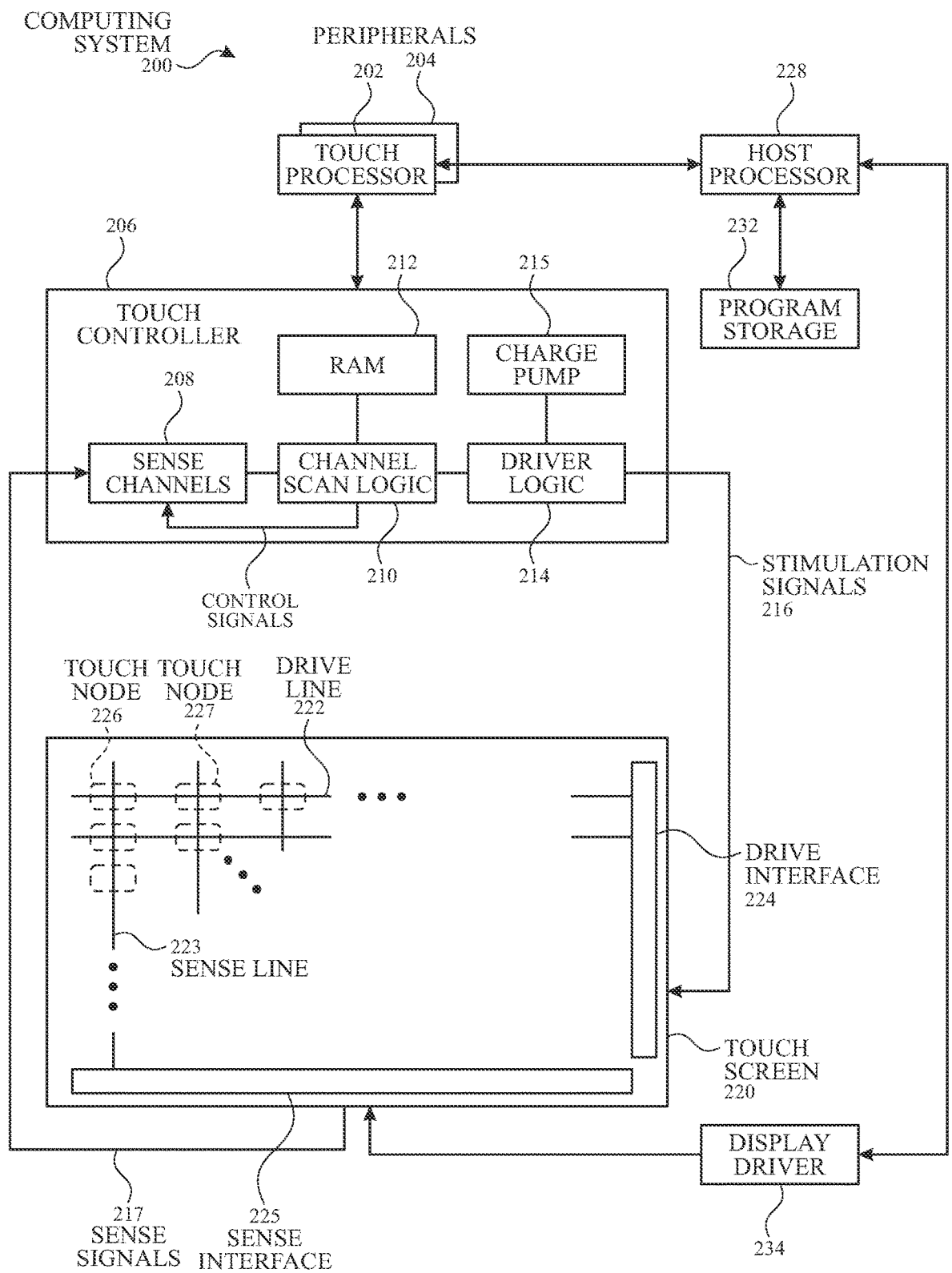
FIG. 2 illustrates an example computing system including a touch screen that can use flex circuit bonding techniques according to examples of the disclosure.

FIG. 2 illustrates an example computing system including a touch screen that can use flex circuit bonding techniques according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers, co-processor(s) and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may be described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, capturing an image with a camera in communication with the electronic device, exiting an idle/sleep state of the electronic device, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224 and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided. It should be understood that, in some examples, touch screen 220 can perform self-capacitance measurements to detect touch and drive lines 222 and sense lines 223 can instead function as self-capacitance touch electrodes. In some examples, the touch electrodes can be disposed in an array as described below with reference to FIG. 4B.

Figure 3A:
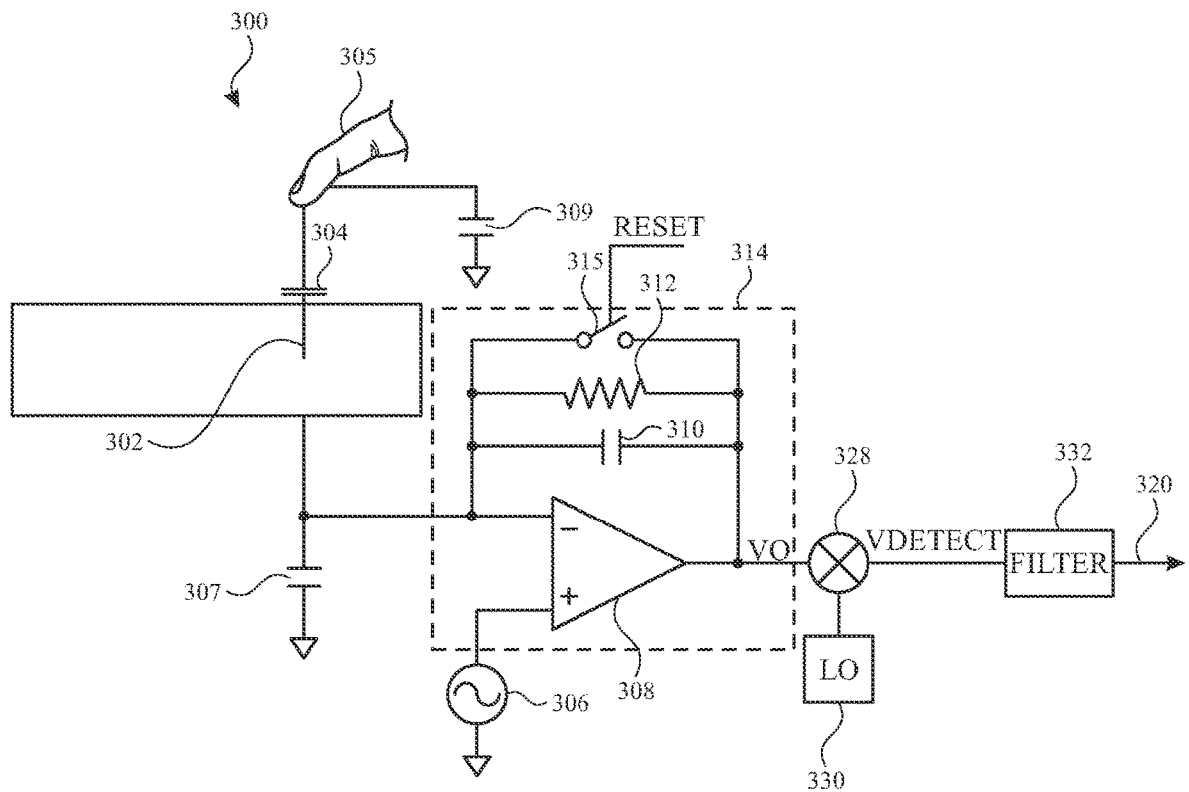
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit corresponding to a self-capacitance measurement of a touch node electrode 302 and sensing circuit 314 (e.g., corresponding to a sense channel 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be approximated as capacitance 304 as capacitance 304 can be much smaller than the body capacitance 309 and thus can dominate the overall ground capacitance. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. The output voltage amplitude of amplifier 308 is approximately $V_{ac}*(1+X_{FB}/(X_{CS}+X_{CSNS}))$, where $X_{FB}$, $X_{CS}$ and $X_{CSNS}$ are the impedances of the feedback network, capacitors 307 and 304, respectively, at the frequency of $V_{ac}$. The output of the amplifier 308 can be demodulated at the frequency of stimulus signal $V_{ac}$ (homodyne or synchronous detection) by demodulator 328 and then integrated (or averaged) by filter 332. The resulting output 320 can be used by a processor to determine the presence of a proximity or touch event, or the output can be inputted into a discrete logic network to determine the presence of a proximity or touch event. Note that in some examples, demodulator can be an I/Q demodulator. In some examples, the demodulator can be in the digital domain, where the output of amplifier 308 could be digitized first by an ADC before performing digital demodulation. It should be appreciated that circuitry for measuring the self-capacitance of touch electrodes can vary without departing from the scope of the disclosure.

Figure 3B:
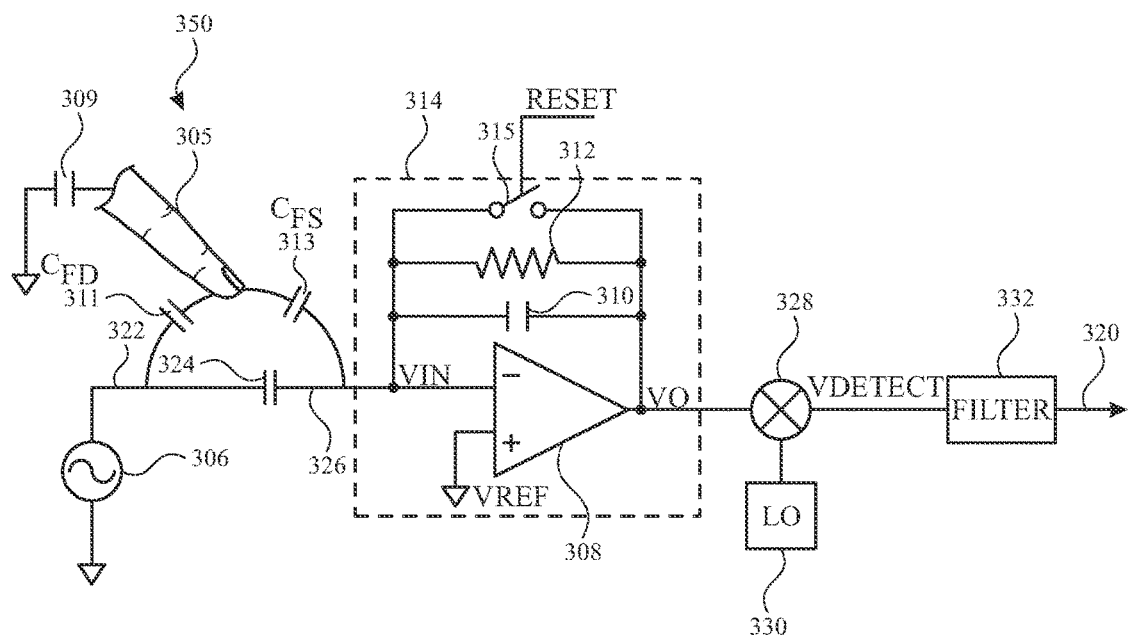
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as $V_{in}$) can be inputted into the inverting input of operational amplifier 308, and the non-inverting input of the operational amplifier can be coupled to a reference voltage $V_{ref}$. Operational amplifier 308 can drive its output to voltage Vo to keep yin substantially equal to $V_{ref}$ and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310, and the impedance of mutual capacitance 324. The output of the amplifier 308 is demodulated at the frequency of stimulus signal $V_{ac}$ (homodyne or synchronous detection) by demodulator 328 and then integrated (or averaged) by filter 332. Note that in some examples, demodulator can be an I/Q demodulator. In some examples, the demodulator (or I/Q demodulator) can be in the digital domain, where the output of amplifier 308 can be digitized first by an ADC before performing demodulation and filtering.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
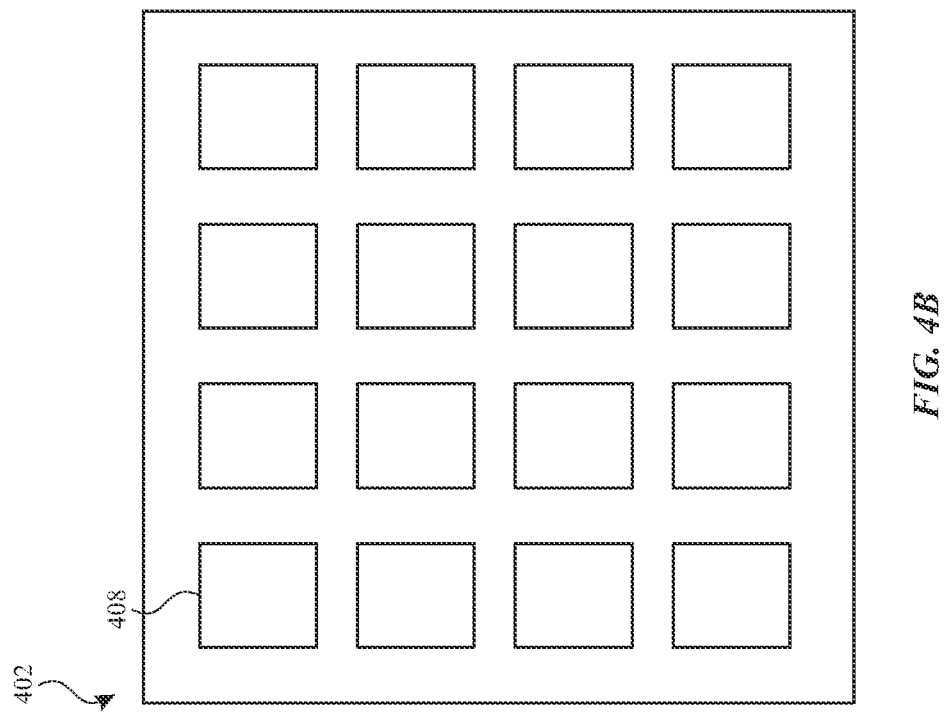
FIG. 4B illustrates touch screen with touch node electrodes arranged in a pixelated touch node electrode configuration according to examples of the disclosure.
Figure 4A:
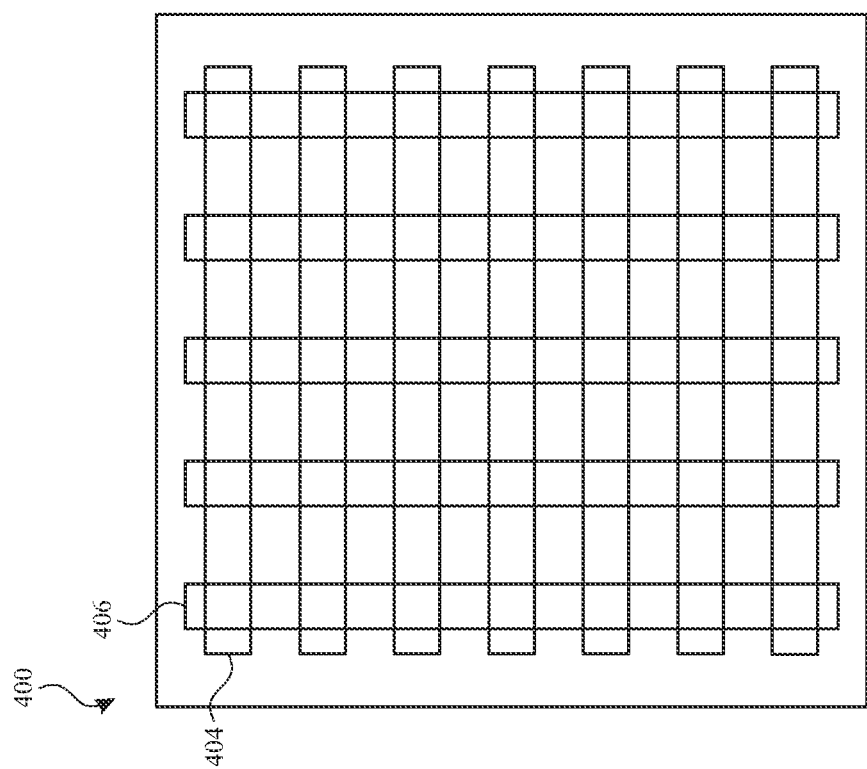
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400. Although the touch electrodes 404 and 406 are illustrated as being rectangle-shaped, it should be understood that other electrode shapes and structures (e.g., diamond-, square-, stripe- or circle-shaped electrodes connected by jumpers or vias) are possible.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402. Although touch node electrodes 408 are illustrated as having rectangular shapes, it should be understood that other electrode shapes (e.g., diamonds, circles, stripes etc.) and structures are possible.

As described above, in some examples, an electronic device can use mutual or self-capacitance-based touch sensing to detect one or more objects proximate to or in contact with a surface of a touch screen incorporated into or in communication with an electronic device. For example, the electronic device can detect one or more user inputs via a touchscreen when the user touches or hovers a part of their body (e.g., a finger) or an input device (e.g., a stylus or other conductive object) over the touchscreen. In some situations, users may wish to use their electronic device in wet environments (e.g., swimming pools, showers, while exercising, while exposed to rainy weather). Droplets of water can collect on the surface of the touchscreen and, in some situations, if the droplets of water are coupled to a reference voltage of the electronic device, such as by being in contact with a conductive housing of the electronic device, the touchscreen may detect the droplets of water. In some examples, it can be desirable to distinguish drops of water or other objects other than the body of the user or an input device in use by the user from intentional touches provided by the user (e.g., via the body of the user or an input device in use by the user).

FIG. 5 illustrates a cross section of an exemplary electronic device 500 according to some examples of the disclosure. In some examples, the electronic device 500 can correspond to one of the electronic devices described above with reference to FIGS. 1A-1E. The electronic device can include a housing 502, a touch screen 504, touch circuitry 510, a sense electrode 512, one or more drive electrodes 514, and a strap 518 that can be used to attach the electronic device 500 to the user (e.g., for a wearable device such as a smart watch). It should be understood that the touch screen 504 can also include touch electrodes different from drive electrode 514 and sense electrode(s) 512. In some examples, the touch screen 504 can be operatively coupled to touch circuitry 510 or the electronic device 500 can further include second touch circuitry operatively coupled to touch screen 504. The touch screen 504 can detect the user's finger 508 and a drop of water 506 in contact with the surface of the touch screen 504 in some examples.

As shown in FIG. 5, in some examples, the electronic device 500 can include a first surface 520 along which the touch screen 504 can be disposed and a second surface 522 along which the one or more drive electrodes 514 can be disposed. Although only portions of strap 518 are shown in FIG. 5 for ease of illustration, it should be understood that strap 518 can extend beyond the portions shown and can form a connected loop or can include a clasp to enable the strap 518 to be used to attach device 500 to the user. In some examples, while the electronic device 500 is attached to the user via strap 518, at least a portion of the second surface 522 can be in contact with the user's body. Thus, for example, when the electronic device 500 applies a drive signal to the drive electrode(s) 514, the drive signal can be coupled to the user's body. In some examples, the drive signal may not couple to the drop of water 506 (e.g., because the water 506 may not be in contact with or proximate to the drive electrodes 514 on the second side 522 of the device 500).

In some examples, the electronic device 500 can use touch circuitry 510 to control modulation of a connection between the drive electrode(s) 514 and a reference voltage (e.g., ground) of the electronic device 500 via switches 516a-516b. In some examples, touch circuitry 510 can apply drive signals to drive electrode(s) 514 and, optionally, switches 516a-516b may be omitted. Thus, in some examples, patches of touch data corresponding to the finger 508 of the user can share one or more characteristics (e.g., such as modulation to the reference voltage) with the drive signal applied to the drive electrodes 514, whereas patches of touch data corresponding to the drop of water 506 may not share the characteristics with the drive signal. As will be described in more detail below with reference to FIGS. 6A-6B, the electronic device can identify characteristic(s) of the drive signal applied to drive electrode(s) 514 in the touch data to identify patches of touch data corresponding to user touches.

In some situations, however, the user may use the electronic device 500 without being in contact with the second surface 522 of the electronic device. For example, the user may use the electronic device 500 without the electronic device 500 being attached to the user, there may be an object between the second surface 522 of the electronic device and the user (e.g., the user's clothing, a protective case for the device, etc.), or the strap 518 may fit loosely around the user such that the second surface 522 may not make good contact with the body of the user. In some examples, in these situations, the drive signal applied to the drive electrodes 514 may not couple to the user's skin, so patches of touch data corresponding to the user may not share characteristics with the drive signal applied to the drive electrode(s).

In some examples, sense electrode 512 can be used to sense the coupling of the drive signal of drive electrode(s) 514 to the skin of the user. Sense electrode 512 can be sensed using self-capacitance in some examples. In some examples, if the data sensed at the sense electrode does not include the signal applied to the drive electrode(s) 514, the electronic device 500 can determine that the user is poorly coupled or not coupled to the drive electrode(s) 514 or strongly coupled to a reference voltage other than the signal provided by drive electrode(s) 514. For example, the user may be strongly coupled to ground of the electronic device 500 (e.g., through the housing 502 of the electronic device 500), which may interfere with the ability of drive electrode(s) 514 to drive a signal onto the body of the user. While the user is poorly coupled or not coupled to the drive electrode(s) 514, the electronic device 500 can forgo classifying patches of touch data based on characteristics of the drive signal of drive electrode(s) 514 (e.g., because patches of touch data caused by user inputs will not include characteristics of the drive signal while the user is poorly coupled or not coupled to drive electrode(s) 514) and/or modify the classification algorithm (e.g., to change the threshold values (e.g., touch detection threshold, secondary drive signal threshold, etc.)). Moreover, in some examples, sense electrode 512 can be used to measure the phase of the drive signal coupled to the user, which can be used to identify patch(es) of touch data corresponding to the user based on the patch(es) including a characteristic (e.g., modulation) of the coupled drive signal. In some examples, sense electrode 512 can be disposed beneath a cover material 524 of surface 522.

FIGS. 6A-6B illustrate exemplary frames of touch data according to some examples of the disclosure. In some examples, the electronic device 500 in FIG. 5 can periodically sense touch data to obtain a plurality of frames of touch data, each frame of touch data being sensed at a different instant in time. For example, touch data frame 600 in FIG. 6A and touch data frame 610 in FIG. 6B can be sensed at different times.

In FIG. 6A, the touch data frame 600 can include a first patch 602 of touch data and a second patch 604a of touch data. In some examples, the patches 602 and 604a of touch data can correspond to objects proximate to or in contact with the touch screen 504 of electronic device 500. For example, patch 602 can correspond to water 506 and patch 604a can correspond to the user's finger 508. In some examples, the electronic device 500 can be configured to track the patches 602 and 604a of touch data across multiple frames of data. Tracking patches of touch data over multiple frames of touch data can enable the electronic device to detect touch gestures (e.g., movement of an object proximate to or in contact with touch screen 504) and/or detect characteristics of the drive signal of drive electrode(s) 514 in patches of touch data over time.

In FIG. 6A, the touch data frame 610 can include the first patch 602 of touch data and the second patch 604b of touch data. In some examples, patch 602 in frame 600 and 610 can correspond to the same object (e.g., water 506) and patch 604a in frame 600 and 604b in frame 610 can correspond to the same object (e.g., the finger 508 of the user). The shading of patch 602 in FIGS. 6A and 6B can indicate that the intensity (e.g., signal strength) of the patch 602 can remain substantially (e.g., within 1%, 2%, 3%, 5%, 10%, 15%, etc. of) constant across frames 600 and 610, for example. In some examples, the shading of patch 604a in FIG. 6A and the shading of patch 604b in FIG. 6B can indicate that the intensity (e.g., signal strength) of patch 604a-b can vary across frames 600 and 610. For example, the intensity of patch 604a-b can vary because the touch signal of patch 604a-b can be modulated with the drive signal applied to drive electrode(s) 514.

Thus, in some examples, by identifying the variation of signal strength of patch 604a-b across frames 600 and 610 that corresponds to a characteristic (e.g., modulation) of the drive signal of drive electrode(s) 514, the electronic device 500 can distinguish a patch of data 604a-b caused by the user touching the touch screen 504 with their finger 508 from a patch 602 of touch data caused by water 506. In some examples, this technique can be used by the system in a touch processing method 700 described below with reference to FIG. 7.

Figure 7:
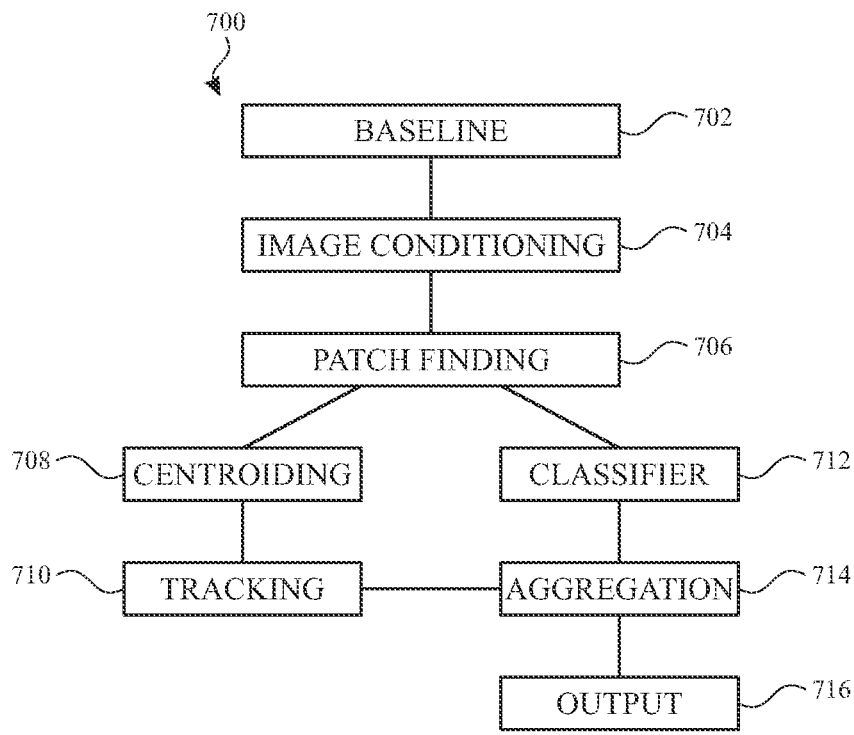
FIG. 7 illustrates an exemplary method 700 of processing touch(es) detected by touch screen 504 according to some examples of the disclosure.

FIG. 7 illustrates an exemplary method 700 of processing touch(es) detected by touch screen 504 according to some examples of the disclosure. At 702, the electronic device 500 can subtract a baseline from the touch data. In some examples, the baseline can correspond to the touch data measured while there are no objects in contact with or proximate to the touch screen 504. At 704, the electronic device 500 can perform image conditioning to condition the image for further processing. At 706, the electronic device 500 can identify the one or more patches of touch data based on the detected centroids. At 708, the electronic device 500 can calculate the centroid of each patch in each of a plurality of frames of data. At 710, the electronic device 500 can track movement of each patch of data, such as by tracking movement of the centroid of each patch of touch data across multiple frames of touch data. At 712, the electronic device 500 can classify one or more patches of touch data as being caused by a user touch (e.g., patch 604a-b) or being caused by an object other than the user, such as water (e.g., patch 602), as described above with reference to FIG. 6. At 714, the electronic device 500 can aggregate the classification results over several frames of touch data, including tracking patches that move from one frame to the next, to reduce errors in the classification and finalize the identification of patches of touch data corresponding to user interaction and patches of touch data not corresponding to user interaction. The output 716 can include determining the location and/or movement over several frames of touch data of patch(es) of touch data corresponding to user touch.

In some examples, the electronic device 500 can perform one or more operations in accordance with touch inputs corresponding to user touch. For example, the electronic device 500 can perform operations such as making a selection, initiating playback of an item of content, initiating display of a user interface associated with a selected user interface element, initiate communication with another electronic device, and the like. In some examples, the electronic device can forgo performing actions in accordance with touch data that does not correspond to user input (e.g., touch data corresponding to water). For example, in response to detecting a touch at a location of a user interface element, the electronic device 500 performs the action in accordance with the user interface element if the touch is determined to be a user touch and forgoes the action if the touch is determined not the be a user touch (e.g., water).

In some examples, there are various possible arrangements for the drive electrode(s) 514 and sense electrode 512 to enable the electronic device 500 to perform method 700. FIGS. 8A-8E illustrate various possible sense electrode 512 arrangements and FIGS. 9A-9D illustrate various possible drive electrode arrangements. It should be understood that other designs are possible without departing from the scope of the disclosure.

Figure 8A:
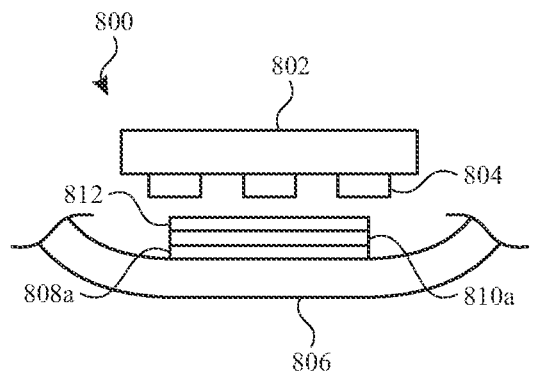
FIG. 8A illustrates an exemplary sense electrode arrangement according to some examples of the disclosure.

FIG. 8A illustrates an exemplary sense electrode 808a arrangement 800 that can be incorporated into electronic device 500 according to some examples of the disclosure. In some examples, arrangement 800 can be incorporated into electronic device 500 described above with reference to FIG. 5. For example, arrangement 800 can include cover material 806 and sense electrode 808a that can correspond to cover material 524 and sense electrode 512, respectively, as shown in FIG. 5. In some examples, arrangement 800 can further include a printed circuit board (PCB) 802 including sensors 804, a substrate 810a, and a shield electrode 812.

In some examples, sensors 804 can include optical sensors. For example, the optical sensors 804 can be used by the electronic device 500 to measure a physiological characteristic of the user, such as heart rate. Thus, in some examples, shield electrode 812, substrate 810a, sense electrode 808a, and cover material 806 can be at least partially transparent (e.g., at least at locations of sensors 804).

In some examples, shield electrode 812 can be disposed on substrate 810a such that the substrate 810a is between the shield electrode 812 and the sense electrode 808a. In some examples, as shown in FIG. 8A, the shield electrode 812 is between the sense electrode 808a and the sensors 804, which can reduce parasitic coupling between the sense electrode 808a and other electronic components of the electronic device 500, including sensors 804, any other components of PCB 802, or any other components of the electronic device 500. In some examples, sense electrode 808a can be coupled to the cover material 806 via lamination or another suitable technique. In some examples, shield electrode 812 can be coupled to PCB 802 using an adhesive (e.g., ACF) or another suitable technique. In some examples, the positions of shielding electrode 812 and sense electrode 808a can be reversed with the sense electrode 808a being disposed between the shield electrode 812 and the sensors 804 (e.g., to shield the sense electrode 808a from drive electrodes 514. Moreover, in some examples, additional shielding can be used to provide shielding both between sense electrode 808a and sensors 804 and also between sense electrode 808a and drive electrodes 514.

It should be understood that FIG. 8A illustrates a subset of components that can be included in an electronic device according to arrangement 800. For example, the electronic device can further include the components described above with reference to FIGS. 1-5.

Figure 8B:
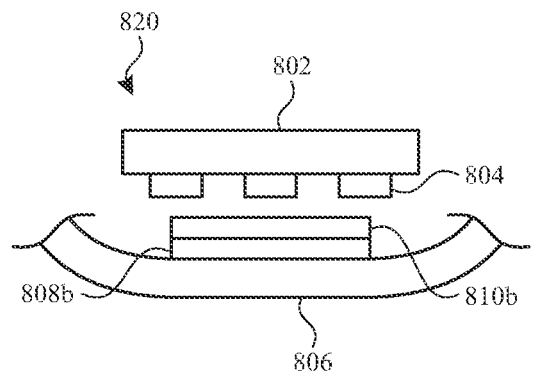
FIG. 8B illustrates an exemplary sense electrode arrangement according to some examples of the disclosure.

FIG. 8B illustrates exemplary sense electrode 808b arrangement 820 that can be incorporated into electronic device 500 according to some examples of the disclosure. In some examples, arrangement 820 can be incorporated into electronic device 500 described above with reference to FIG. 5. For example, arrangement 820 can include cover material 806 and sense electrode 808b that can correspond to cover material 524 and sense electrode 512, respectively, as shown in FIG. 5. In some examples, arrangement 820 can further include PCB 802 and optical sensors 804, as described above with reference to FIG. 8A. Arrangement 820 can further include a substrate 810b to which the sense electrode 808b can be coupled.

In some examples, sense electrode 808b can be disposed between substrate 810b and cover material 806 and the substrate 810b can be disposed between the sense electrode 808b and the PCB 802. For example, the substrate 810b can be coupled to the PCB 802 via an adhesive, such as a conductive adhesive (e.g., silver epoxy). It should be understood that FIG. 8B illustrates a subset of components that can be included in an electronic device according to arrangement 820. For example, the electronic device can further include the components described above with reference to FIGS. 1-5.

Figure 8C:
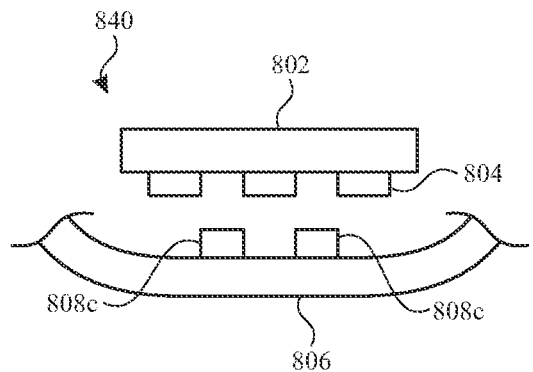
FIG. 8C illustrates an exemplary sense electrode arrangement according to some examples of the disclosure.

FIG. 8C illustrates exemplary sense electrode 808c arrangement 840 that can be incorporated into electronic device 500 according to some examples of the disclosure. In some examples, arrangement 840 can be incorporated into electronic device 500 described above with reference to FIG. 5. For example, arrangement 840 can include cover material 806 and sense electrode 808c that can correspond to cover material 524 and sense electrode 512, respectively, as shown in FIG. 5. In some examples, arrangement 840 can further include PCB 802 and optical sensors 804, as described above with reference to FIGS. 8A-8B.

In some examples, sense electrode 808c can be disposed between PCB 802 and cover material 806. In some examples, sense electrode 808c can be deposited on cover material 806 using physical vapor deposition (PVD) or another suitable technique and/or adhered to PCB 802 using an adhesive, such as a conductive epoxy (e.g., silver epoxy). FIG. 8C can be a cross-section of arrangement 840 so, although the portions of sense electrode 808c can appear to be separate components, in some examples, the portions of sense electrode 808c in FIG. 8C can be connected at locations not shown in FIG. 8C. For example, electrode 808c can have a hollow ring, rectangle, or other structure. In some examples, electrode 808c can be shaped to reduce, substantially eliminate, or eliminate overlap with sensors 804, thus enabling the sense electrode 808c to be formed from an opaque material without obstructing sensors 804, which can be optical sensors. It should be understood that FIG. 8C illustrates a subset of components that can be included in an electronic device according to arrangement 820. For example, the electronic device can further include the components described above with reference to FIGS. 1-5.

Figure 8D:
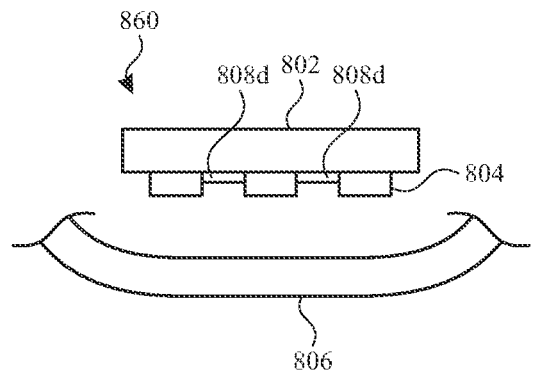
FIG. 8D illustrates an exemplary sense electrode arrangement according to some examples of the disclosure.

FIG. 8D illustrates exemplary sense electrode 808d arrangement 860 that can be incorporated into electronic device 500 according to some examples of the disclosure. In some examples, arrangement 860 can be incorporated into electronic device 500 described above with reference to FIG. 5. For example, arrangement 860 can include cover material 806 and sense electrode 808d that can correspond to cover material 524 and sense electrode(s) 512, respectively, as shown in FIG. 5. In some examples, arrangement 860 can further include PCB 802 and optical sensors 804, as described above with reference to FIGS. 8A-8C.

In some examples, sense electrode 808d can be a multi-functioning component that also acts as the ground plane for PCB 802. In some examples, operation of sense electrode 808d can be time-multiplexed to be coupled to a reference voltage (e.g., functioning as a ground electrode) during one or more first time periods and to be coupled to sense circuitry (e.g., functioning as a sense electrode) during one or more second time periods. In some examples, sense electrode 808d may not be coupled to a reference voltage. Thus, in some examples, arrangements 800, 820, 840, and

880 in FIGS. 8A-C and 8E can further include ground planes (e.g., that are either coupled or not coupled to a reference voltage) at the location of sense electrode 808*d* in FIG. 8D. In some examples, sense electrode 808*d* can include a conductive material such as copper. It should be understood that FIG. 8D illustrates a subset of components that can be included in an electronic device according to arrangement 860. For example, the electronic device can further include the components described above with reference to FIGS. 1-5.

Figure 8E:
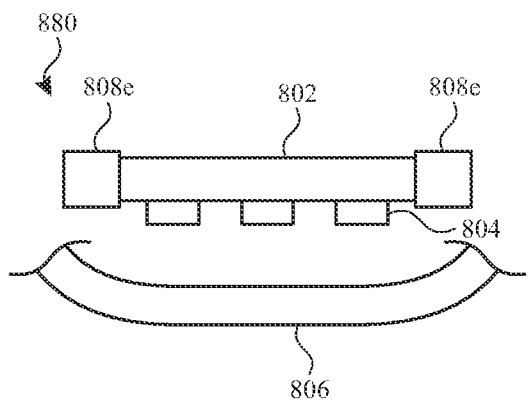
FIG. 8E illustrates an exemplary sense electrode arrangement according to some examples of the disclosure.

FIG. 8E illustrates exemplary sense electrode 808*e* arrangement 880 that can be incorporated into electronic device 500 according to some examples of the disclosure. In some examples, arrangement 880 can be incorporated into electronic device 500 described above with reference to FIG. 5. For example, arrangement 880 can include cover material 806 and sense electrode 808*e* that can correspond to cover material 524 and sense electrode 512, respectively, as shown in FIG. 5. In some examples, arrangement 880 can further include PCB 802 and optical sensors 804, as described above with reference to FIGS. 8A-8D.

In some examples, sense electrode 808*e* can be a multifunctioning component that also acts as an inductive charging component for the electronic device. In some examples, the multifunctioning sense electrode 808*e* can include a ferrite coil disposed around the PCB 802. Although the portions of the sense electrode 808*e* in FIG. 8E appear to be separate components, it should be understood that, in some examples, the portions of sense electrode 808*e* can be connected at locations not shown in FIG. 8E, which can be a cross-section of arrangement 880. For example, the sense electrode 808*e* can have a coil or other hollow shape with the PCB 802 disposed in the hollow portion of the sense electrode 808*e*. It should be understood that FIG. 8E illustrates a subset of components that can be included in an electronic device according to arrangement 880. For example, the electronic device can further include the components described above with reference to FIGS. 1-5.

FIGS. 9A-9D illustrate exemplary drive electrode arrangements that can be incorporated into electronic device 500 according to some examples of the disclosure. In some examples, the drive electrode(s) 514 can be disposed on, embedded in, or proximate to surface 522 of the electronic device 500. In some examples, while the electronic device 500 is attached to the user (e.g., via strap 518), surface 522 can be in contact with the body of the user. FIGS. 9A-9D can illustrate a plurality of exemplary arrangements of the drive electrode(s) 514 when viewing surface 522 of the electronic device.

Figures 9A, 9B:
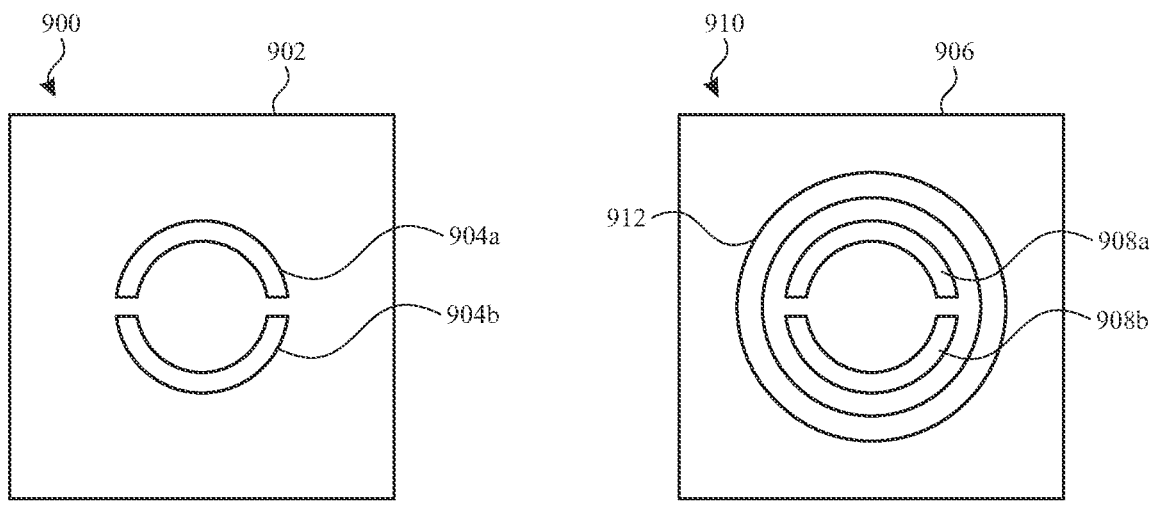
FIGS. 9A-9D illustrate exemplary drive electrode arrangements that can be incorporated into an electronic device according to some examples of the disclosure.

FIG. 9A illustrates an exemplary arrangement 900 of drive electrodes 904*a-b* according to some examples of the disclosure. Arrangement 900 can include surface 902 and electrodes 904*a-b*, for example. In some examples, electronic device 500 discussed above with reference to FIG. 5 can include arrangement 900. For example, surface 902 and electrodes 904*a-b* in FIG. 9A can correspond to surface 522 and drive electrode(s) 514 in FIG. 5, respectively.

In some examples, electrodes 904*a-b* can be multifunctioning electrodes that can be used to apply the drive signal to the body of the user and sense a physiological characteristic of the user. For example, electrodes 904*a-b* can be used to measure an electrocardiogram (ECG) of the user in an automatic or on-demand ECG measurement process. In some examples, the functions of the electrodes 904*a-b* can be time-multiplexed: during one or more first time periods (e.g., while touch is being sensed with touch screen 504), the electronic device 500 can use the electrodes 904*a-b* to drive the secondary drive signal to the user's body as described above and during one or more second time periods (e.g., while an ECG measurement process is being performed), the electronic device 500 can use the electrodes 904*a-b* to measure the user's heartbeat for the ECG.

FIG. 9B illustrates an exemplary arrangement 910 of drive electrode 912 according to some examples of the disclosure. Arrangement 910 can include surface 906, drive electrode 912, and physiological electrodes 908*a*-908*b* for example. In some examples, electronic device 500 discussed above with reference to FIG. 5 can include arrangement 910. For example, surface 906 and drive electrode 912 in FIG. 9B can correspond to surface 522 and drive electrode(s) 514 in FIG. 5, respectively. In some examples, drive electrode 912 can be used to apply the drive signal to the body of the user, as described above with reference to FIGS. 5-7. In some examples, physiological electrodes 908*a*-908*b* can be used to measure an electrocardiogram (ECG) of the user in an automatic or on-demand ECG measurement process.

Figures 9C, 9D:
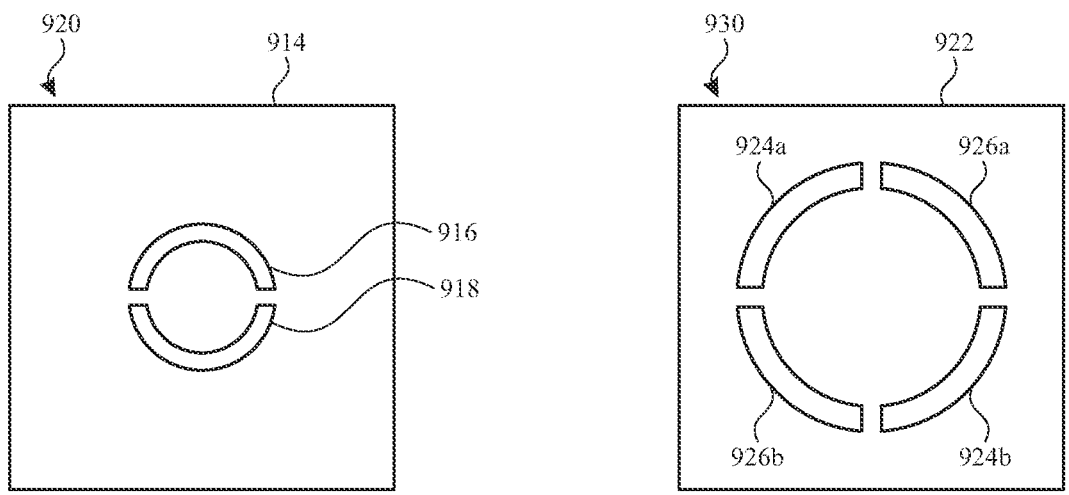

FIG. 9C illustrates an exemplary arrangement 920 of drive electrode 916 according to some examples of the disclosure. Arrangement 920 can include surface 914, drive electrode 916, and physiological electrode 918 for example. In some examples, electronic device 500 discussed above with reference to FIG. 5 can include arrangement 920. For example, surface 914 and drive electrode 916 in FIG. 9C can correspond to surface 522 and drive electrode(s) 514 in FIG. 5, respectively.

In some examples, drive electrode 916 can be a multifunctioning electrode that can be used to apply the drive signal to the body of the user and sense a physiological characteristic of the user. Physiological electrode 918 can be used with drive electrode 916 to sense the physiological characteristic of the user in some examples. For example, drive electrode 916 and physiological electrode 918 can be used to measure an ECG of the user in an automatic or on-demand ECG measurement process. In some examples, the functions of the drive electrode 916 can be time-multiplexed: during one or more first time periods (e.g., while touch is being sensed with touch screen 504), the electronic device 500 can use the drive electrode 916 to drive the secondary drive signal to the user's body as described above and during one or more second time periods (e.g., while an ECG measurement process is being performed), the electronic device 500 can use the drive electrode 916 and physiological electrode 918 to measure the user's heartbeat for the ECG.

Although FIG. 9C illustrates one possible arrangement 920 of drive electrode 916 and physiological electrode 918, it should be understood that in some examples, the positions of drive electrode 916 and 918 can vary from those shown in FIG. 9C without departing from the scope of the disclosure. For instance, the positions of drive electrode 916 and physiological electrode 918 can be reversed or rotated.

FIG. 9D illustrates an exemplary arrangement 930 of drive electrodes 924*a-b* according to some examples of the disclosure. Arrangement 930 can include surface 922, drive electrodes 924*a-b*, and physiological electrodes 926*a-b*, for example. In some examples, electronic device 500 discussed above with reference to FIG. 5 can include arrangement 930. For example, surface 922 and drive electrodes 924*a-b* in FIG. 9D can correspond to surface 522 and electrode(s) 514 in FIG. 5, respectively.

In some examples, drive electrodes 924*a-b* can be multifunctioning electrodes that can be used to apply the drive signal to the body of the user and sense a physiological characteristic of the user. Physiological electrodes 926*a-b* can be used with drive electrodes 924*a-b* to sense the physiological characteristic of the user in some examples. For example, drive electrodes 924*a-b* and physiological electrodes 926*a-b* can be used to measure an ECG of the user in an automatic or on-demand ECG measurement process. In some examples, the functions of the drive electrodes 924*a-b* can be time-multiplexed: during one or more first time periods (e.g., while touch is being sensed with touch screen 504), the electronic device 500 can use the drive electrodes 924*a-b* to drive the secondary drive signal to the user's body as described above and during one or more second time periods (e.g., while an ECG measurement process is being performed), the electronic device 500 can use the drive electrodes 924*a-b* and physiological electrodes 926*a-b* to measure the user's heartbeat for the ECG. In some examples, drive electrodes 924*a-b* only function as drive electrodes and the electronic device 500 uses physiological electrodes 926*a-b* without drive electrodes 924*a-b* to perform the ECG measurement process (e.g., automatically or on-demand).

Although FIG. 9D illustrates one possible arrangement 930 of drive electrodes 924*a-b* and physiological electrodes 926*a-b*, it should be understood that in some examples, the positions of drive electrode 924*a-b* and 926*a-b* can vary from those shown in FIG. 9D without departing from the scope of the disclosure. For instance, the positions of drive electrodes 924*a-b* and physiological electrode 924*a-b* can be reversed or rotated.

Figure 10:
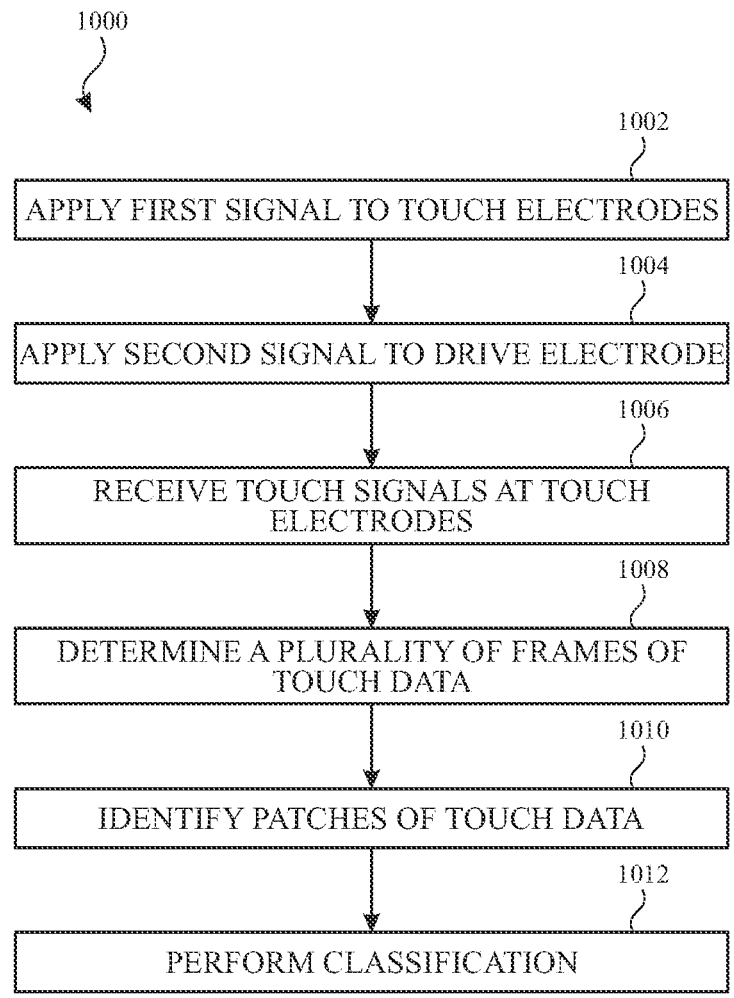
FIG. 10 illustrates an exemplary method differentiating touch data indicative of a user from touch data indicative of another proximate or touching object (e.g., a water droplet) according to some examples of the disclosure.

FIG. 10 illustrates an exemplary method 1000 differentiating touch data indicative of a user from touch data indicative of another proximate or touching object (e.g., a water droplet) according to some examples of the disclosure. Method 1000 can be used with any of the electronic devices, methods, component arrangements, and other details described above with reference to FIGS. 5-9D.

At 1002, in some examples, the electronic device 500 can apply a first signal to the touch electrodes of touch screen 504. In some examples, the first signal can be a drive signal applied to drive electrodes of a mutual capacitance touch screen or a self-capacitance signal applied to the touch electrodes of the self-capacitance touch screen.

In some examples, at 1004, the electronic device 500 can apply a second signal to the drive electrode(s) 514. The drive signal can be applied using circuitry 510 in some examples. For example, the drive signal can be a modulation of a connection to a reference voltage of the electronic device (e.g., ground) via switches 516*a-b*. In some examples, the drive electrode(s) 514 can be disposed according to one of the arrangements 900, 910, 920, or 930 described above with reference to FIGS. 9A-9D.

At 1006, in some examples, the electronic device 500 can receive touch signals at the touch electrodes of touch screen 504. For example, the electronic device 500 can sense touch signals at sense electrodes of a mutual capacitance touch screen and/or sense touch signals at the electrodes of a self-capacitance touch screen.

In some examples, at 1008, the electronic device 500 can determine a plurality of frames of touch data. Each frame of touch data can include touch measurements at each touch node of the touch screen 504 that represent an image of touch at the touch screen 504 during the period of time in which the touch data included in the frame were sensed, for example. In some examples, the electronic device 500 can capture a plurality of frames of touch data representative of the images of touch at the touch screen 504 at different periods of time. In some examples, the drive signals applied to the touch screen 504 can vary across frames. For example, a drive signal with a first phase may be applied to the touch screen 504 while measuring a first frame of touch data and a drive signal with a second phase may be applied to touch screen 504 while measuring a second frame of touch data.

At 1010, in some examples, the electronic device 500 can identify one or more patches in the plurality of frames of touch data. In some examples, each patch can represent a respective object touching or proximate to the touch screen. Identifying the one or more patches can enable the electronic device 500 to track movement of objects touching or proximate to the touch screen across multiple frames of data.

In some examples, at 1012, the electronic device 500 can perform a classification process to determine which patches in the touch data represent user input and which represent other objects (e.g., water). In some examples, the electronic device 500 can classify the patches by detecting characteristics of the drive signal applied to drive electrode(s) 514 (e.g., frequency, modulation to ground, etc.) in one or more patches over a plurality of frames of touch data. For example, patches including the characteristic of the drive signal can correspond to user touch and patches that do not include the characteristic of the drive signal can correspond to other objects (e.g., water). In some examples, performing the classification can include one or more steps of method 700 described above with reference to FIG. 7.

Some examples of the disclosure are directed to an electronic device comprising a housing including a first side and a second side; a touch screen disposed on the first side of the housing, the touch screen including one or more touch electrodes coupled to first circuitry configured to apply a first signal to the one or more touch electrodes; a drive electrode disposed on the second side of the housing, the drive electrode coupled to second circuitry configured to provide a second signal to the drive electrode; and one or more processors configured to: receive touch signals sensed at the one or more touch electrodes; identify a patch of touch data based on the touch signals, the patch of touch data corresponding to an object; and determine whether the patch of touch data corresponds to a touch input based on a characteristic of the second signal detected in the touch signals. Additionally or alternatively, in some examples the electronic device further includes a sense electrode disposed on the second side of the housing, wherein the one or more processors are further configured to: sense a third signal at the sense electrode; and in accordance with a determination that the third signal does not include a respective characteristic of the second signal, modify performance of determining whether the patch of touch data corresponds to the touch input. Additionally or alternatively, in some examples the electronic device further includes a first cover material disposed on the second side of the electronic device between the drive electrode and the sense electrode. Additionally or alternatively, in some examples the electronic device further includes a second cover material disposed on the first side of the electronic device. Additionally or alternatively, in some examples modifying performance of determining whether the patch of touch data corresponds to the touch input includes forgoing determining whether the patch of touch data corresponds to the touch input. Additionally or alternatively, in some examples modifying performance of determining whether the patch of touch data corresponds to the touch input includes modifying one or more threshold values for determining whether the patch of touch data corresponds to the touch input. Additionally or alternatively, in some examples the drive electrode is a multi-functional electrode further configured to sense physiological data of a user of the electronic device. Additionally or alternatively, in some examples the electronic device is a wearable device further comprising a strap configured to couple the electronic device to a user such that the drive electrode is in contact with the user. Additionally or alternatively, in some examples the second circuitry is configured to modulate a connection of the drive electrode to ground to create the second signal. Additionally or alternatively, in some examples the first side is opposite from the second side. Additionally or alternatively, in some examples the one or more processors are further configured to: apply a baseline to the touch data; identify a centroid of the patch of touch data; track movement of the patch of touch data over a plurality of frames of touch data; and aggregate classification of the patch of touch data included in the touch signals over the plurality of frames of touch data. Additionally or alternatively, in some examples, the one or more processors are further configured to in accordance with a determination that the patch of touch data corresponds to the touch input, perform an operation on the electronic device in accordance with the patch of touch data; and in accordance with a determination that the patch of touch data does not correspond to the touch input, forgo performing the operation. Additionally or alternatively, in some examples the one or more processers are further configured to determine a plurality of frames of touch data from the touch signals, wherein the plurality of frames of touch data are sampled at different times, identifying the patch of touch data includes identifying the patch of touch data in the plurality of frames of touch data, and determining whether the patch of touch data corresponds to the touch input is based on the characteristic of the second signal detected in the plurality of frames of touch data.

Some examples of the disclosure are directed to a portable consumer electronic device comprising an energy storage device; communication circuitry; a housing including a first side and a second side; a touch screen disposed on the first side of the housing, the touch screen including one or more touch electrodes coupled to first circuitry configured to apply a first signal to the one or more touch electrodes; a drive electrode disposed on the second side of the housing, the drive electrode coupled to second circuitry configured to provide a second signal to the drive electrode; and one or more processors configured to: receive touch signals sensed at the one or more touch electrodes; identify a patch of touch data based on the touch signals, the patch of touch data corresponding to an object; and determine whether the patch of touch data corresponds to a touch input based on a characteristic of the second signal detected in the touch signals. Additionally or alternatively, in some examples the electronic device further includes a sense electrode disposed on the second side of the housing, wherein the one or more processors are further configured to: sense a third signal at the sense electrode; and in accordance with a determination that the third signal does not include a respective characteristic of the second signal, modify performance of determining whether the patch of touch data corresponds to the touch input. Additionally or alternatively, in some examples modifying performance of the classification process includes forgoing the classification process. Additionally or alternatively, in some examples modifying performance of the classification process includes modifying one or more threshold values of the classification process. Additionally or alternatively, in some examples, the one or more processers are further configured to determine a plurality of frames of touch data from the touch signals, wherein the plurality of frames of touch data are sampled at different times, identifying the patch of touch data includes identifying the patch of touch data in the plurality of frames of touch data, and determining whether the patch of touch data corresponds to the touch input is based on the characteristic of the second signal detected in the plurality of frames of touch data.

Some examples of the disclosure are directed to a method, comprising: at an electronic device including a housing, a touch screen including one or more touch electrodes disposed on a first side of the housing, a drive electrode disposed on the second side of the housing, and one or more processors: applying, via first circuitry, a first signal to the one or more touch electrodes; applying, via second circuitry, a second signal to the drive electrode; receiving touch signals sensed at the one or more touch electrodes; identifying a patch of touch data based on the touch signals; and determining whether the patch of touch data corresponds to a touch input based on a characteristic of the second signal detected in the touch signals. Additionally or alternatively, in some examples the electronic device further includes a sense electrode disposed on the second side of the housing, and the method further comprises sensing, via sense circuitry, a third signal at the sense electrode; and in accordance with a determination that the third signal does not include a respective characteristic of the second signal, modifying performance of the classification process. Additionally or alternatively, in some examples modifying performance of determining whether the patch of touch data corresponds to the touch. Additionally or alternatively, in some examples modifying performance of the classification process includes modifying one or more threshold values of the classification process. Additionally or alternatively, in some examples the method further includes applying a baseline to the touch data; identifying a centroid of the patch of touch data; tracking movement of the patch of touch data over a plurality of frames of touch data; and aggregating classification of the patch of touch data included in the touch signals over the plurality of frames of touch data. Additionally or alternatively, in some examples, the method further includes in accordance with a determination that the patch of touch data corresponds to the touch input, performing an operation on the electronic device in accordance with the respective patch of touch data; and in accordance with a determination that the patch of touch data does not correspond to the touch input, forgoing performing the operation. Additionally or alternatively, in some examples the method includes determining a plurality of frames of touch data from the touch signals, wherein the plurality of frames of touch data are sampled at different times, wherein identifying the patch of touch data includes identifying the patch of touch data in the plurality of frames of touch data, and wherein determining whether the patch of touch data corresponds to the touch input is based on the characteristic of the second signal detected in the plurality of frames of touch data.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:
1. An electronic device comprising:
a housing including a first side and a second side;
a touch screen disposed on the first side of the housing, the touch screen including one or more touch electrodes coupled to first circuitry configured to apply a first signal to the one or more touch electrodes;

a drive electrode disposed on the second side of the housing, the drive electrode coupled to second circuitry configured to provide a second signal to the drive electrode; and one or more processors configured to:
receive touch signals sensed at the one or more touch electrodes of the touch screen;
identify a patch of touch data based on the touch signals, the patch of touch data corresponding to an object; and
determine whether the patch of touch data corresponds to a touch input based on a characteristic of the second signal detected in the touch signals.

2. The electronic device of claim 1, further comprising:
a sense electrode disposed on the second side of the housing, wherein the one or more processors are further configured to:
sense a third signal at the sense electrode; and
in accordance with a determination that the third signal does not include a respective characteristic of the second signal, modify performance of determining whether the patch of touch data corresponds to the touch input.

3. The electronic device of claim 2, further comprising:
a first cover material disposed on the second side of the electronic device between the drive electrode and the sense electrode.

4. The electronic device of claim 3, further comprising:
a second cover material disposed on the first side of the electronic device.

5. The electronic device of claim 2, wherein modifying performance of determining whether the patch of touch data corresponds to the touch input includes forgoing determining whether the patch of touch data corresponds to the touch input.

6. The electronic device of claim 2, wherein modifying performance of determining whether the patch of touch data corresponds to the touch input includes modifying one or more threshold values for determining whether the patch of touch data corresponds to the touch input.

7. The electronic device of claim 1, wherein the drive electrode is a multi-functional electrode further configured to sense physiological data of a user of the electronic device.

8. The electronic device of claim 1, wherein the electronic device is a wearable device further comprising a strap configured to couple the electronic device to a user such that the drive electrode is in contact with the user.

9. The electronic device of claim 1, wherein the second circuitry is configured to modulate a connection of the drive electrode to ground to create the second signal.

10. The electronic device of claim 1, wherein the first side is opposite from the second side.

11. The electronic device of claim 1, wherein the one or more processors are further configured to:
apply a baseline to the touch data;
identify a centroid of the patch of touch data;
track movement of the patch of touch data over a plurality of frames of touch data; and
aggregate classification of the patch of touch data included in the touch signals over the plurality of frames of touch data.

12. The electronic device of claim 1, wherein the one or more processors are further configured to:
in accordance with a determination that the patch of touch data corresponds to the touch input, perform an operation on the electronic device in accordance with the patch of touch data; and
in accordance with a determination that the patch of touch data does not correspond to the touch input, forgo performing the operation.

13. The electronic device of claim 12, further comprising:
a sense electrode disposed on the second side of the housing, wherein the one or more processors are further configured to:
sense a third signal at the sense electrode; and
in accordance with a determination that the third signal does not include a respective characteristic of the second signal, modify performance of determining whether the patch of touch data corresponds to the touch input.

14. The electronic device of claim 13, wherein:
the one or more processors are further configured to determine a plurality of frames of touch data from the touch signals, wherein the plurality of frames of touch data are sampled at different times,
identifying the patch of touch data includes identifying the patch of touch data in the plurality of frames of touch data, and
determining whether the patch of touch data corresponds to the touch input is based on the characteristic of the second signal detected in the plurality of frames of touch data.

15. The electronic device of claim 1, wherein:
the one or more processors are further configured to determine a plurality of frames of touch data from the touch signals, wherein the plurality of frames of touch data are sampled at different times, identifying the patch of touch data includes identifying the patch of touch data in the plurality of frames of touch data, and
determining whether the patch of touch data corresponds to the touch input is based on the characteristic of the second signal detected in the plurality of frames of touch data.

16. A portable consumer electronic device comprising:
an energy storage device;
communication circuitry;
a housing including a first side and a second side;
a touch screen disposed on the first side of the housing, the touch screen including one or more touch electrodes coupled to first circuitry configured to apply a first signal to the one or more touch electrodes;
a drive electrode disposed on the second side of the housing, the drive electrode coupled to second circuitry configured to provide a second signal to the drive electrode; and
one or more processors configured to:
receive touch signals sensed at the one or more touch electrodes;
identify a patch of touch data based on the touch signals, the patch of touch data corresponding to an object; and
determine whether the patch of touch data corresponds to a touch input based on a characteristic of the second signal detected in the touch signals.

17. A method, comprising:
at an electronic device including a housing, a touch screen including one or more touch electrodes disposed on a first side of the housing, a drive electrode disposed on the second side of the housing, and one or more processors:
applying, via first circuitry, a first signal to the one or more touch electrodes;
applying, via second circuitry, a second signal to the drive electrode;

receiving touch signals sensed at the one or more touch electrodes;

identifying a patch of touch data based on the touch signals; and determining whether the patch of touch data corresponds to a touch input based on a characteristic of the second signal detected in the touch signals.

18. The method of claim 17, wherein the electronic device further includes a sense electrode disposed on the second side of the housing, and the method further comprises sensing, via sense circuitry, a third signal at the sense electrode; and in accordance with a determination that the third signal does not include a respective characteristic of the second signal, modifying performance of determining whether the patch of touch data corresponds to the touch input.

19. The method of claim 17, further comprising:

in accordance with a determination that the patch of touch data corresponds to the touch input, performing an operation on the electronic device in accordance with the respective patch of touch data; and in accordance with a determination that the patch of touch data does not correspond to the touch input, forgoing performing the operation.

20. The method of claim 17, further comprising:

determining a plurality of frames of touch data from the touch signals, wherein the plurality of frames of touch data are sampled at different times, wherein identifying the patch of touch data includes identifying the patch of touch data in the plurality of frames of touch data, and wherein determining whether the patch of touch data corresponds to the touch input is based on the characteristic of the second signal detected in the plurality of frames of touch data.

* * * * *